(12) United States Patent
Reed et al.

(10) Patent No.: US 10,474,009 B2
(45) Date of Patent: Nov. 12, 2019

(54) FILTER ADJUSTMENT OF VEHICLE CAMERAS

(71) Applicant: Ford Global Technologies, LLC, Dearborn, MI (US)

(72) Inventors: Eric L. Reed, Livonia, MI (US); Adil Nizam Siddiqui, Farmington Hills, MI (US); Jonathan Diedrich, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/614,436

(22) Filed: Jun. 5, 2017

(65) Prior Publication Data
US 2018/0348596 A1 Dec. 6, 2018

(51) Int. Cl.
| | |
|---|---|
| *G03B 17/12* | (2006.01) |
| *H04N 5/238* | (2006.01) |
| *H04N 5/225* | (2006.01) |
| *G02B 7/00* | (2006.01) |
| *G03B 11/00* | (2006.01) |

(52) U.S. Cl.
CPC ............ *G03B 17/12* (2013.01); *G02B 7/006* (2013.01); *G03B 11/00* (2013.01); *H04N 5/2254* (2013.01); *H04N 5/238* (2013.01); *B60R 2300/8066* (2013.01); *B60R 2300/8086* (2013.01)

(58) Field of Classification Search
USPC ....................................................... 382/104
See application file for complete search history.

(56) References Cited

U.S. PATENT DOCUMENTS

| | | | |
|---|---|---|---|
| 7,538,311 B2 | 5/2009 | Watanabe | |
| 8,411,146 B2 * | 4/2013 | Twede | H04N 9/045 250/225 |
| 10,237,458 B2 * | 3/2019 | Lim | G02B 7/09 |
| 10,334,187 B2 * | 6/2019 | Reed | H04N 5/332 |
| 2005/0157939 A1 * | 7/2005 | Arsenault | G06T 5/10 382/260 |
| 2012/0008930 A1 | 1/2012 | Barley et al. | |
| 2012/0116632 A1 | 5/2012 | Bechtel | |
| 2014/0066767 A1 | 3/2014 | Mammone | |

(Continued)

FOREIGN PATENT DOCUMENTS

| | | |
|---|---|---|
| CN | 206100228 U | 4/1917 |
| CN | 108551549 A | 9/1918 |

(Continued)

OTHER PUBLICATIONS

Search Report dated Nov. 30, 2018 for GB Patent Application No. GB 1809060.5 (5 pages).

(Continued)

*Primary Examiner* — Ishrat I Sherali
(74) *Attorney, Agent, or Firm* — Frank Lollo; Eversheds Sutherland (US) LLP

(57) ABSTRACT

Method and apparatus are disclosed for filter adjustment of vehicle cameras. An example vehicle camera includes sensors, a lens to direct light to the sensors, a slide including a first filter and a second filter, and an electromagnet to actuate the slide between a first position and a second position. The first filter is between the sensors and the lens at the first position. The second filter is between the sensors and the lens at the first position.

17 Claims, 6 Drawing Sheets

(56) References Cited

U.S. PATENT DOCUMENTS

| | | | |
|---|---|---|---|
| 2015/0156427 A1 | 6/2015 | Wagner | |
| 2015/0256767 A1 | 9/2015 | Schlechter | |
| 2015/0321621 A1 | 11/2015 | Van Dan Elzen | |
| 2016/0200264 A1 | 7/2016 | Bingle | |
| 2017/0094258 A1* | 3/2017 | Cooper | H04N 9/09 |
| 2017/0098313 A1* | 4/2017 | Collopy | G06T 11/001 |

FOREIGN PATENT DOCUMENTS

| | | | | |
|---|---|---|---|---|
| CN | 201344986 Y | | 11/2009 | |
| CN | 201392444 Y | | 1/2010 | |
| CN | 105513251 A | | 4/2016 | |
| CN | 205958900 U | * | 2/2017 | ............ G03B 17/14 |
| CN | 105991908 A | | 6/2019 | |
| DE | 102014215373 A1 | | 2/2016 | |
| GB | 2088073 A | | 6/1982 | |
| JP | 2006222844 A | | 8/2006 | |
| JP | 2010064531 A | | 3/2010 | |
| JP | 2011041216 A | | 2/2011 | |
| KR | 100436813 B1 | | 6/2004 | |
| KR | 20100104556 A | | 9/2010 | |
| KR | 20160056113 A | | 5/2016 | |
| KR | 20160056113 A | * | 5/2016 | ............ G03B 17/12 |
| KR | 101639685 B1 | | 7/2016 | |

OTHER PUBLICATIONS

Search Report dated Jul. 1, 2019 for GB Patent Application No. GB 1809060.5 (3 pages).

* cited by examiner

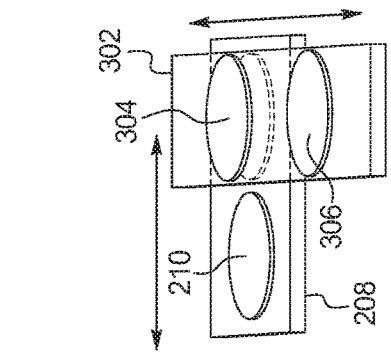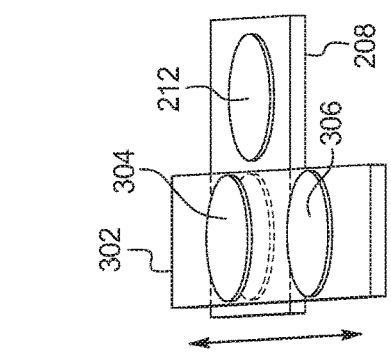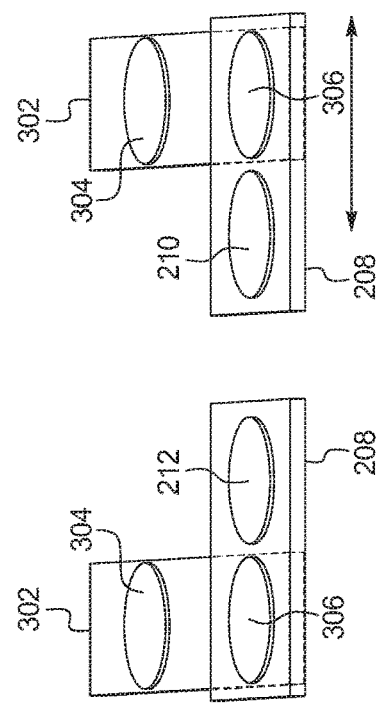
FIG. 3A    FIG. 3B    FIG. 3C    FIG. 3D

FILTER ADJUSTMENT OF VEHICLE CAMERAS

TECHNICAL FIELD

The present disclosure generally relates to vehicle cameras and, more specifically, to filter adjustment of vehicle cameras.

BACKGROUND

Oftentimes, vehicles include cameras (e.g., digital cameras, analog cameras) that capture image(s) and/or video. In some instances, the image(s) and/or video captured via the cameras are presented to a driver (e.g., via a center console display) to facilitate the driver in operating the vehicle. Additionally or alternatively, the image(s) and/or video captured via the cameras are analyzed by a vehicle module to enable autonomous and/or semi-autonomous motive functions to be performed by the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for filter adjustment of vehicle cameras. An example disclosed vehicle includes a camera that includes a lens, image sensors to collect light, and a slide including a first filter and a second filter. The example disclosed vehicle also includes a filter controller to determine a light condition based upon the light and cause, responsive to determining the light condition is a first light condition, an electromagnet to position the slide at a first position at which the first filter is between the image sensors and the lens.

An example disclosed method for adjusting vehicle camera filters includes collecting light of a surrounding area and determining, via a filter controller, a light condition based upon the light. The example disclosed method also includes sending, responsive to determining the light condition is a first light condition, a signal to an electromagnet to position a slide of a vehicle camera at a first position. A first filter of the slide is between image sensors and a camera lens at the first position.

An example disclosed vehicle camera includes sensors, a lens to direct light to the sensors, a slide including a first filter and a second filter, and an electromagnet to actuate the slide between a first position and a second position. The first filter is between the sensors and the lens at the first position. The second filter is between the sensors and the lens at the first position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 3A illustrates example light filter slides of the camera of FIG. 2 in an orientation.

FIG. 3B illustrates another orientation of the light filter slides of FIG. 3A.

FIG. 3C illustrates another orientation of the light filter slides of FIG. 3A.

FIG. 3D illustrates another orientation of the light filter slides of FIG. 3A.

DETAILED DESCRIPTION OF EXAMPLE EMBODIMENTS

Figure 1:
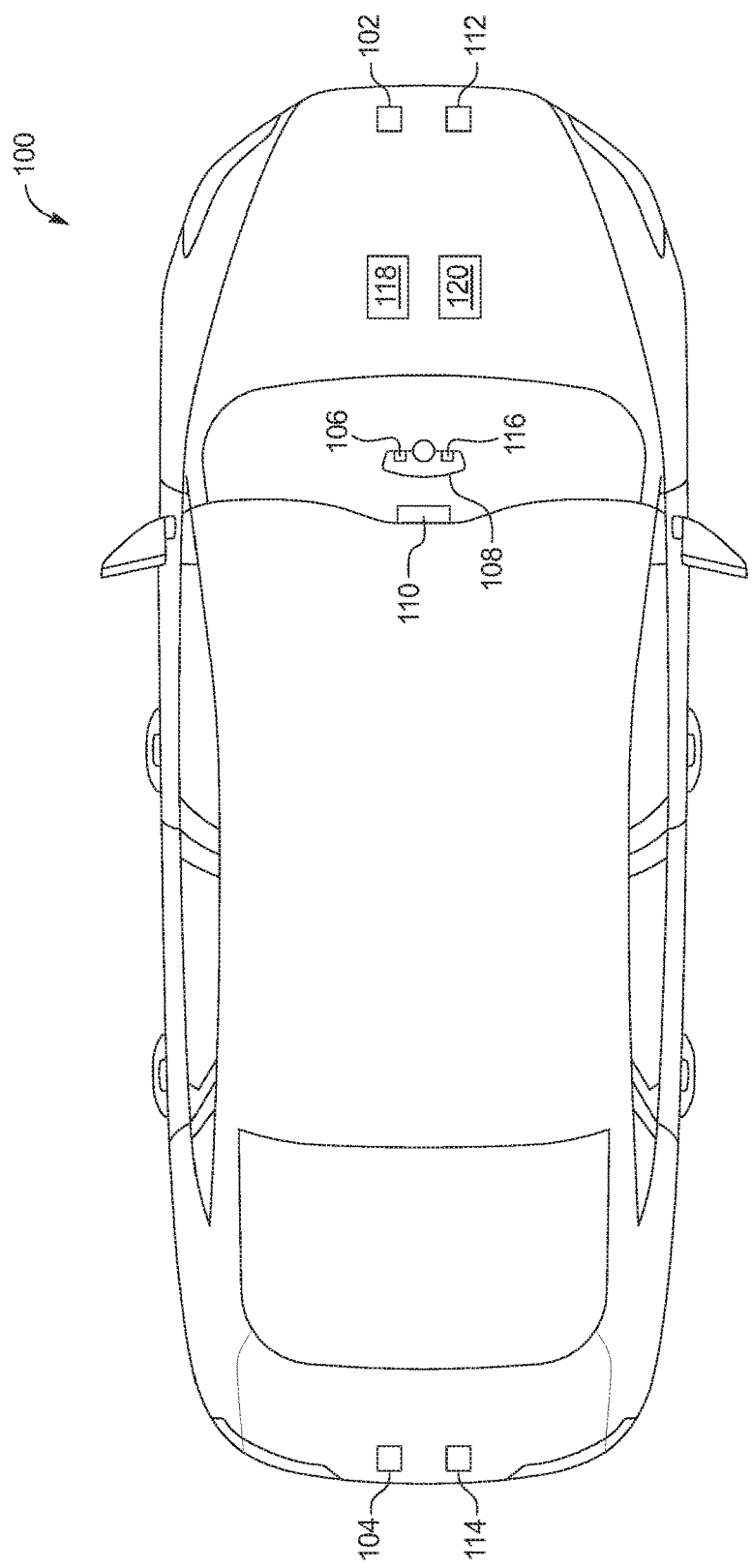
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include cameras (e.g., digital cameras, analog cameras) that capture image(s) and/or video. In some instances, the image(s) and/or video captured via the cameras are presented to a driver (e.g., via a center console display) to facilitate the driver in operating the vehicle. Additionally or alternatively, the image(s) and/or video captured via the cameras are analyzed by a vehicle module to enable autonomous and/or semi-autonomous motive functions to be performed by the vehicle. Some vehicle cameras include a filter to facilitate the vehicle camera in obtaining clear images for analysis by the vehicle module. Oftentimes, a filter implemented in the vehicle camera facilitates the vehicle camera in obtaining clear images in one lighting environment (e.g., clear skies) but is unable to facilitate the vehicle camera in obtaining clear images in other lighting environments (e.g., foggy conditions).

The example methods, apparatus, and machine readable media include a vehicle camera that includes a lens and image sensors to collect light. Further, the vehicle camera includes filter(s) and a filter swapping mechanism that is configured to swap and/or combine different filter(s) for positioning between the lens and the image sensors to affect or filter the light collected by the light filters. For example, the vehicle camera includes electromagnet(s) that toggle slide(s) on which the filter(s) are located to adjust which of the filter(s) are positioned between the lens and the image sensors. Further, a filter controller determines a light condition of the light that is collected by the vehicle camera and causes the electromagnet(s) to position the slide(s) based on the detected light condition to affect which of the filter(s) are positioned between the lens and the image sensors.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes a camera 102 (e.g., a first camera), a camera 104 (e.g., a second camera), and a camera 106 (e.g., a third camera). For example, the camera 102 and the camera 104 are located on an exterior surface of the vehicle 100. The camera 102 is a front-view camera (e.g., a first front-view camera) that captures image(s) and/or video of an area in front of the vehicle 100, and the camera 104 is a rearview camera that captures image(s) and/or video of an area behind the vehicle 100. Further, the camera 106 is located on a rearview mirror 108 within a cabin of the vehicle 100. The camera 106 (e.g, a second front-view camera) is directed is oriented in a direction toward a front of the vehicle 100 to enable the camera 104 to capture image(s) and/or video of the area in front of the vehicle 100 (e.g., through a front windshield). In some examples, the image(s) and/or video captured by the camera 102, the camera 104, and/or the camera 106 are presented to occupant(s) of the vehicle 100 via a display 110, such as a center console display, to facilitate a driver in maneuvering the vehicle 100. Additionally or alternatively, the captured image(s) and/or video are utilized to facilitate the vehicle 100 in performing autonomous and/or semi-autonomous driving maneuver(s).

The camera 102, the camera 104, and/or the camera 106 of the illustrated example are capable of measuring a luminosity, a brightness, and/or other characteristics of ambient light. For example, the camera 102 includes sensors (e.g., image sensors 206 of FIG. 2) that detect characteristics of ambient light (e.g., a luminosity, a brightness, and/or other characteristics) around the camera 102, the camera 104 includes sensors (e.g., the image sensors 206) that detect characteristics of ambient light around the camera 104, and the camera 106 includes sensors (e.g., the image sensors 206) that detect characteristics of ambient light around the camera 106.

In the illustrated example, the vehicle 100 includes sensors that are capable of detecting characteristics of ambient light around the cameras of the vehicle 100. For example, a sensor 112 (e.g., a first sensor) is capable of detecting characteristics of the ambient light around the camera 102, a sensor 114 (e.g., a second sensor) is capable of detecting characteristics of the ambient light around the camera 104, and a sensor 116 (e.g., a third sensor) is capable of detecting characteristics of the ambient light around the camera 106. That is, the camera 102 and/or the sensor 112 may be utilized to determine ambient light characteristics of the camera 102, the camera 104 and/or the sensor 114 may be utilized to determine ambient light characteristics of the camera 104, and the camera 106 and/or the sensor 116 may be utilized to determine ambient light characteristics of the camera 106.

The vehicle 100 of the illustrated example also includes a camera module 118 and a filter controller 120. The camera module 118 controls the camera 102, the camera 104, the camera 106, and/or any other camera of the vehicle 100 to collect image(s) and/or video that are presented to occupant(s) of the vehicle 100 and/or utilized to facilitate the vehicle 100 in performing autonomous and/or semi-autonomous driving maneuver(s). The filter controller 120 determines an ambient light condition(s) of the camera 102, the camera 104, and/or the camera 106 and adjusts a filter setting of the camera 102, the camera 104, and/or the camera 106 based on the ambient light condition(s).

Figure 2:
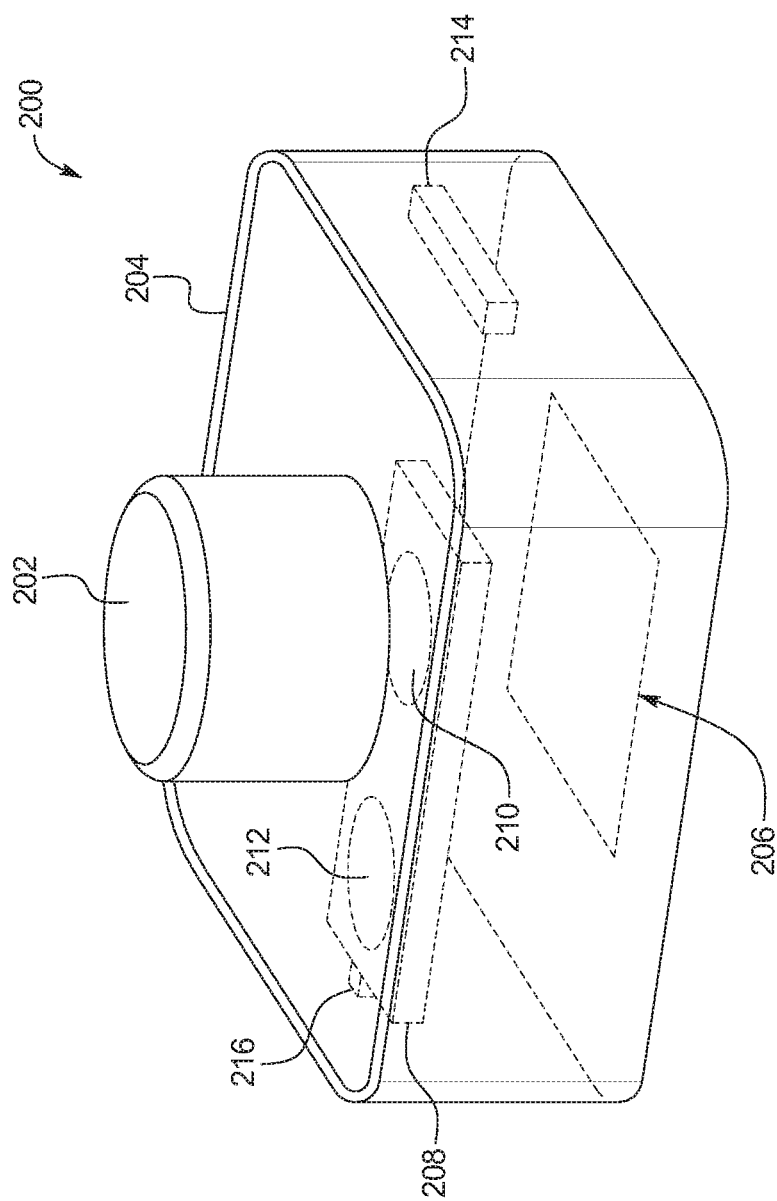
FIG. 2 illustrates an example camera of the vehicle of FIG. 1 in accordance with the teachings herein.

FIG. 2 illustrates an example camera 200 of the vehicle 100. For example, the camera 200 represents the camera 102, the camera 104, the camera 106, and/or any other camera of the vehicle 100. In the illustrated example, the camera 200 includes a lens 202 that is coupled to a housing 204. The camera 200 also includes image sensors 206 and a slide 208 that are disposed within a cavity of the housing 204. As illustrated in FIG. 2, the lens 202 is coupled to a front of the housing 204, the image sensors 206 are located within the housing toward a back of the housing 204, and the slide 208 is positioned at least partially between the lens 202 and the image sensors 206 (e.g., between the front and the back of the housing 204.

The lens 202 of the camera 200 directs light to the image sensors 206 by refracting light onto the image sensors 206 (e.g., onto an image plane defined by the image sensors 206). For example, the lens 202 is formed of a glass material to refract the light. The lens 202 includes a focal length that determines a magnification of an image projected onto the image plane of the image sensors 206 and includes a maximum aperture that affects an intensity of light captured via the camera 200.

The image sensors 206 of the camera 200 collects light that is directed by the lens to image plane formed by the image sensors 206, converts attenuation of light waves of the collected light into signals, and creates an image based upon those signal. For example, the image sensors 206 are digital imaging sensors such as charge-couple device (CCD) sensors, complementary metal-oxide-semiconductor (CMOS) sensors, N-type metal-oxide-semiconductor (NMOS) sensors, etc.

The slide 208 includes a filter 210 (e.g., a first filter) and a filter 212 (e.g., a second filter). As illustrated in FIG. 2, the filter 210 and the filter 212 are adjacent to each other in a side-by-side manner on the slide 208. The filter 210 and the filter 212 are optical filters (e.g., formed of glass, plastic, and/or other transparent materials) that selectively transmit light of different wavelengths to the image sensors 206 of the camera 200.

Some optical filters are near-infrared cut filters that enable visible light (e.g., light having wavelengths of about between 400 nanometers and 700 nanometers) to pass through and reflect infrared light that is near the visible light spectrum (e.g., light having wavelengths of about between 700 nanometers and 2500 nanometers). For example, the filter 210 and/or the filter 212 may be a near-infrared cut filter that filters out the near-infrared light from the light collected by the image sensors 206 to cause image(s) captured by the camera 200 to include light similar to what humans see via an unaided eye. Some optical filters are near-infrared pass filters that enable light near the visible light spectrum (e.g., light having wavelengths of about between 700 nanometers and 1100 nanometers). For example, the filter 210 and/or the filter 212 may be a near-infrared pass filter that enables the near-infrared light pass through to the image sensors 206 to cause image(s) captured by the camera 200 to include light similar to that detected by human vision. Further, some optical filters are polarizer filters (e.g., linear polarizer filters, circular polarizer filters) that enables light wavelengths in some orientations to pass though and prevents other light wavelengths in other orientations from passing through. That is, a linear polarizer filter filters out plane-polarized wavelengths that are oriented in some predetermined orientations. For example, the filter 210 and/or the filter 212 may be a linear polarizer filter that prevents light wavelengths in some orientations and enables light wavelengths in other orientations in passing through to the image sensors 206 to reduce glare caused by reflective surface(s) in image(s) captured by the camera 200.

In the illustrated example, the filter 210 is a first type of filter (e.g., a near-infrared pass filter) and the filter 212 adjacent to the filter 210 is a second type of filter (e.g., a near-infrared cut filter) that is different than the first type of filter. The slide 208 is capable of actuating between a first position and a second position. When the slide 208 is in the first position as illustrated in FIG. 2, the filter 210 is positioned between the lens 202 and the image sensors 206. At the first position, the filter 210 filters light that is subsequently collected by the image sensors 206 such that the image(s) captured by the camera 200 are based upon the light filtered by the filter 210. Otherwise, when the slide 208 is in the second position, the filter 212 is positioned between the lens 202 and the image sensors 206. At the second position, the filter 212 filters light that is subsequently collected by the image sensors 206 such that the image(s) captured by the camera 200 are based upon the light filtered by the filter 212. That is, actuation of the slide 208 enables filtering of light collected by the image sensors 206 to be adjusted to affect the image(s) captured by the camera 200.

As illustrated in FIG. 2, the camera 200 also includes an electromagnet 214 and a biasing element 216 that enable the filter controller 120 to actuate the slide 208 between the first position and the second position. In the illustrated example, the electromagnet 214 and the biasing element 216 are positioned within the cavity of the housing 204. For example, the electromagnet 214 is operatively coupled to the filter controller 120 and produces a magnetic field upon the filter controller 120 sending a signal. The slide 208 includes magnetic material such that the position of the slide 208 is affected by the magnetic field of the electromagnet 214. For example, when the filter controller 120 sends a signal to the electromagnet 214, the electromagnet 214 produces the magnetic field that applies a force in a first direction to the slide 208 to position the slide 208 at the first position. Further, the biasing element 216 (e.g., a spring, another electromagnet) applies is coupled to the slide 208 a force to the slide 208 in a second direction opposite the first direction. When the filter controller 120 sends the signal to the electromagnet 214, the force applied by the magnetic field of the electromagnet 214 in the first direction overcomes the force applied by the biasing element 216 in the second direction to enable the electromagnet 214 to position the slide 208 at the first position. When the filter controller 120 does not send the signal to the electromagnet 214, the electromagnet 214 does not produce the magnetic field and, thus, does not apply the force to the slide 208 in the first direction. As a result, the force applied by the biasing element 216 to the slide 208 in the second direction to position the slide 208 at the second position. That is, the biasing element 216 is coupled to the slide 208 to cause the slide 208 to be biased to the second position.

In operation, the filter controller 120 determines a light condition based upon characteristics of light (e.g., ambient light) surrounding the camera 200. For example, the filter controller 120 may determine the light condition based upon light collected by the camera 200 (e.g., the camera 102, the camera 104, the camera 104) and/or a nearby sensor (e.g., the sensor 112, the sensor 114, the sensor 116). Responsive to determining that the light condition is a first light condition, the filter controller 120 sends a signal to the electromagnet 214 to position the slide 208 at the first position. Responsive to determining that the light condition is a second light condition, the filter controller 120 does not send the signal to the electromagnet 214 to position the slide 208 at the second position.

While the slide 208 of the illustrated example includes two filters, the slide 208 in other examples may include more or less filters. For example, the slide 208 may include a single filter that is positioned between the lens 202 and the image sensors 206 at a first position and is not positioned between the lens 202 and the image sensors 206 at a second position. In other examples, the slide may include three or more filters at which a first filter is positioned between the lens 202 and the image sensors 206 at a first position, a second filter is positioned between the lens 202 and the image sensors 206 at a second position, a third filter is positioned between the lens 202 and the image sensors 206 at a third position, etc.

FIGS. 3A-3D illustrate the slide 208 (e.g., the first slide) and another example slide 302 (e.g., a second slide) of the camera 200 in various orientations relative to each other. More specifically, FIG. 3A depicts the slide 208 and the slide 302 in a first orientation, FIG. 3B depicts the slide 208 and the slide 302 in a second orientation, FIG. 3C depicts the slide 208 and the slide 302 in a third orientation, and FIG. 3D depicts the slide 208 and the slide 302 in a fourth orientation.

As illustrated in FIGS. 3A-3D, the slide 302 includes a filter 304 (e.g., a third filter) and a filter 306 (e.g., a fourth filter). The filter 304 and the filter 306 are adjacent to each other in a side-by-side manner on the slide 302. Further, the filter 304 and the filter 306 are optical filters (e.g., formed of glass, plastic, and/or other transparent materials) that selectively transmit light of different wavelengths to the image sensors 206 of the camera 200.

Further, the slide 208 and the slide 302 are positioned within the housing 204 of the camera 200. As illustrated in FIGS. 3A-3D, the slide 208 and the slide 302 are offset and overlap relative to each other such that each of the slide 208 and the slide 302 are at least partially positioned between the lens 202 and the image sensors 206. For example, the slide 208 is at least partially positioned between the image sensors 206 and the slide 302, and the slide 302 is at least partially positioned between the lens 202 and the slide 208. In the illustrated example, the slide 302 is perpendicular to the slide 208. In other examples, the slide 302 is parallel to and/or at any other angle relative to the slide 208. The housing 204 also includes the electromagnet 214 (e.g., a first electromagnet) and the biasing element 216 (e.g., a first biasing element) to facilitate the actuation of the slide 208 between the first position and the second position. For example, the filter 210 is positioned between the lens 202 and the image sensors 206 at the first position, and the filter 212 is positioned between the lens 202 and the image sensors 206 at the second position. Additionally, the housing 204 includes another electromagnet (e.g., a second electromagnet) and another biasing element (e.g., a first biasing element) to facilitate the slide 302 that includes magnetic material in actuating between a third position and a fourth position. For example, the filter 304 is positioned between the lens 202 and the image sensors 206 at the third position, and the filter 306 is positioned between the lens 202 and the image sensors 206 at the fourth position.

The slide 208 and the slide 302 of the illustrated example are configured such that the filter 210 or the filter 212 of the slide 208 and the filter 304 or the filter 306 of the slide 302 are positioned between the lens 202 and the image sensors 206 to filter light that is subsequently collected by the image sensors 206. That is, the light that is collected by the image sensors 206 is filtered by the filter 210 or the filter 212 as well as the filter 304 or the filter 306.

In the illustrated example, the filter 210 is a near-infrared pass filter, the filter 212 is a near-infrared cut filter, the filter 304 is a linear polarizer filter, and the filter 306 is a clear filter. For example, the clear filter (e.g., formed of glass, plastic, and/or other transparent material) does not affect or filter light passing through to the image sensors 206. In other examples, the filter 210, the filter 212, the filter 304, and the filter 306 may include any other combination of filters that facilitate the camera in capturing image(s) and/or video.

In FIG. 3A, the slide 208 is at the first position and the slide 302 is at the third position such that the filter 210 (e.g., the near-infrared pass filter) and the filter 304 (e.g., the linear polarizer filter) are positioned adjacent to each other in an overlapping manner between the lens 202 and the image sensors 206. For example, the filter controller 120 sends a first signal to the electromagnet 214 to position the slide 208 in the first position and sends a second signal to the other electromagnet to position the slide 302 in the third position in response to determining that the light condition of the area surrounding the camera 200 is a first light condition. That is, upon detecting the first light condition, the filter controller 120 positions the slide 208 and the slide 302 such that the filter 210 and the filter 304 filter the light that is subsequently collected by the image sensors 206 of the camera 200.

In FIG. 3B, the slide 208 is at the second position and the slide 302 is at the third position such that the filter 212 (e.g., the near-infrared cut filter) and the filter 304 (e.g., the linear polarizer filter) are positioned adjacent to each other in an overlapping manner between the lens 202 and the image sensors 206. For example, the filter controller 120 does not send the first signal to the electromagnet 214 to position the slide 208 in the second position and sends the second signal to the other electromagnet to position the slide 302 in the third position in response to determining that the light condition of the area surrounding the camera 200 is a second light condition (e.g., a glare condition). That is, upon detecting the second light condition, the filter controller 120 positions the slide 208 and the slide 302 such that the filter 212 and the filter 304 filter the light that is subsequently collected by the image sensors 206 to reduce an amount of glare (e.g., reflected off an adjacent vehicle) in image(s) captured by the camera 200.

In FIG. 3C, the slide 208 is at the first position and the slide 302 is at the fourth position such that the filter 210 (e.g., the near-infrared pass filter) and the filter 306 (e.g., the clear filter) are positioned adjacent to each other in an overlapping manner between the lens 202 and the image sensors 206. For example, the filter controller 120 sends the first signal to the electromagnet 214 to position the slide 208 in the first position and does not send the second signal to the other electromagnet to position the slide 302 in the fourth position in response to determining that the light condition of the area surrounding the camera 200 is a third light condition (e.g., a fogginess). That is, upon detecting the third light condition, the filter controller 120 positions the slide 208 and the slide 302 such that the filter 210 and the filter 306 filter the light that is subsequently collected by the image sensors 206 to enable the camera to capture image(s) in foggy conditions.

In FIG. 3D, the slide 208 is at the second position and the slide 302 is at the fourth position such that the filter 212 (e.g., the near-infrared cut filter) and the filter 306 (e.g., the clear filter) are positioned adjacent to each other in an overlapping manner between the lens 202 and the image sensors 206. For example, the filter controller 120 does not send the first signal to the electromagnet 214 to position the slide 208 in the second position and does not send the second signal to the other electromagnet to position the slide 302 in the fourth position in response to determining that the light condition of the area surrounding the camera 200 is a fourth light condition (e.g., a standard light condition). That is, upon detecting the fourth light condition, the filter controller 120 positions the slide 208 and the slide 302 such that the filter 212 and the filter 306 filter the light that is subsequently collected by the image sensors 206 to cause image(s) captured by the camera 200 to include light similar to what humans see via an unaided eye.

Figure 4:
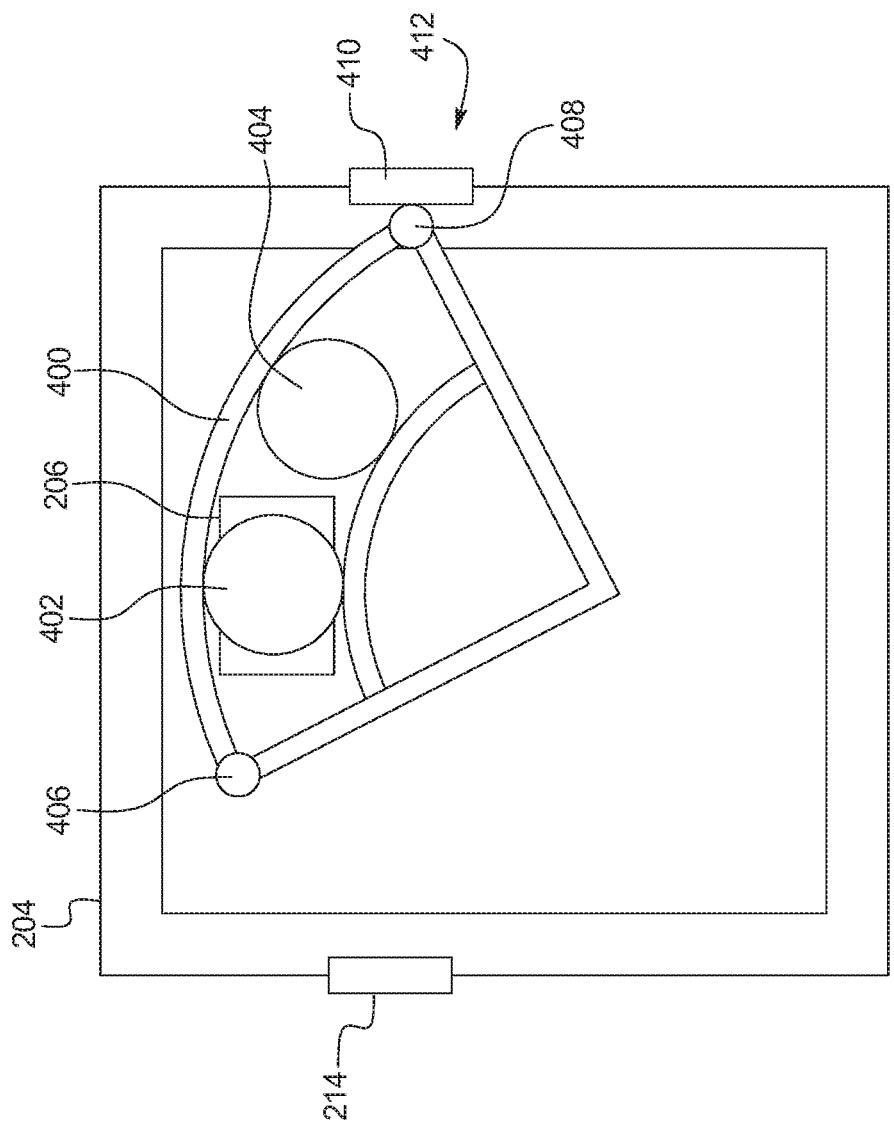
FIG. 4 is a schematic of another example slide of the camera of FIG. 2.

FIG. 4 is a schematic of another example slide 400 within the housing 204 of the camera 200. As illustrated in FIG. 4, the slide 400 includes a filter 402 (e.g., a first filter) and a filter 404 (e.g., a second filter). As illustrated in FIG. 4, the filter 402 and the filter 404 are adjacent to each other in a side-by-side manner on the slide 400. The filter 402 and the filter 404 are optical filters (e.g., formed of glass, plastic, and/or other transparent materials) that selectively transmit light of different wavelengths to the image sensors 206 of the camera 200. In the illustrated example, the filter 402 is a first type of filter (e.g., a near-infrared pass filter) and the filter 404 adjacent is a second type of filter (e.g., a near-infrared cut filter) that is different than the first type of filter. The slide 400 is capable of actuating (e.g., rotating) between a first position and a second position. When the slide 400 is in the first position as illustrated in FIG. 4, the filter 402 is positioned between the lens 202 and the image sensors 206. Otherwise, when the slide 400 is in the second position, the filter 404 is positioned between the lens 202 and the image sensors 206.

As illustrated in FIG. 4, the slide 400 also includes magnetic material 406 (e.g., first magnetic material) and magnetic material 408 (e.g., second magnetic material). Further, the housing includes the electromagnet 214 and a passive magnet 410. The electromagnet 214 and the passive magnet 410 are positioned relative to the magnetic material 406 and the magnetic material 408 of the slide 400, respectfully, to cause the slide 400 to rotate between the first position and the second position. For example, the magnetic material 408 and the passive magnet 410 form a biasing element 412.

In the illustrated example, the electromagnet 214 is operatively coupled to the filter controller 120 and produces a magnetic field upon the filter controller 120 sending a signal. The position of the slide 400 is affected by the magnetic field of the electromagnet 214. For example, when the filter controller 120 sends a signal to the electromagnet 214, the electromagnet 214 produces the magnetic field that applies a force to the magnetic material 406 in a first direction to position the slide 400 at the first position. Further, the passive magnet 410 applies a second force to the magnetic material 408 in a second direction opposite the first direction. When the filter controller 120 sends the signal to the electromagnet 214, the force applied by the magnetic field of the electromagnet 214 in the first direction overcomes the force applied by the biasing element 412 in the second direction to enable the electromagnet 214 to position the slide 400 at the first position. When the filter controller 120 does not send the signal to the electromagnet 214, the electromagnet 214 does not produce the magnetic field and, thus, does not apply the force to the slide 400 in the first direction. As a result, the force applied by the passive magnet 410 in the second direction positions the slide 400 at the second position. That is, the biasing element 412 biases the slide 400 toward the second position.

Figure 5:
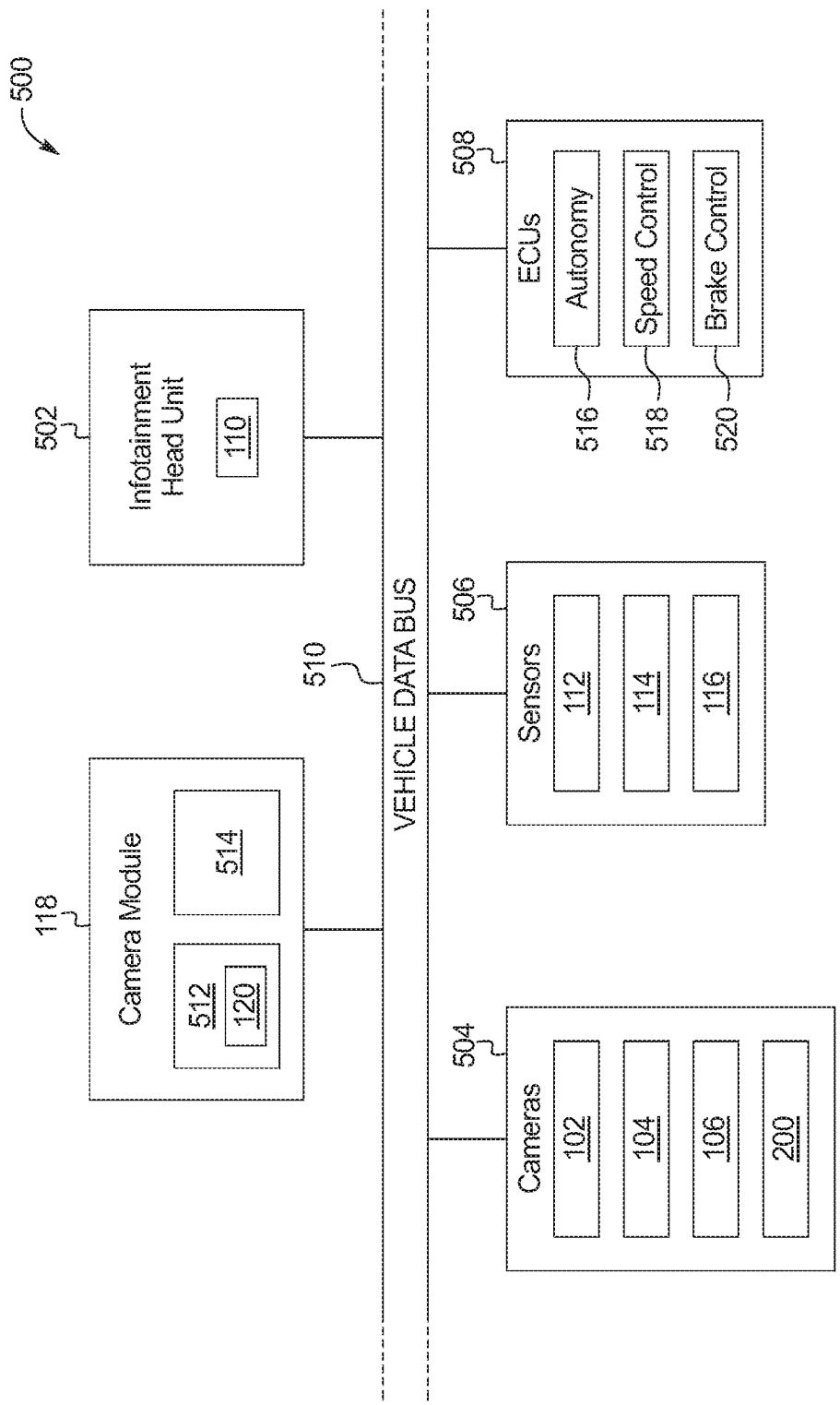
FIG. 5 is a block diagram of electronic components of the vehicle of FIG. 1.

FIG. 5 is a block diagram of electronic components 500 of the vehicle 100. As illustrated in FIG. 5, the electronic components 500 includes the camera module 118, an infotainment head unit 502, cameras 504, sensors 506, electronic control units 508, and a vehicle data bus 510.

The camera module 118 includes a microcontroller unit, controller or processor 512 and memory 514. In some examples, the processor 512 of the camera module 118 is structured to include the filter controller 120. Alternatively, in some examples, the filter controller 120 is incorporated into another electronic control unit (ECU) with its own processor 512 and memory 514. The processor 512 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 514 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 514 includes multiple kinds of memory, particularly volatile memory and non-volatile memory.

The memory 514 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 514, the computer readable medium, and/or within the processor 512 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 502 provides an interface between the vehicle 100 and a user. The infotainment head unit 502 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the display 110 (e.g., a heads-up display, a center console display such as a liquid crystal display (LCD), an organic light emitting diode (OLED) display, a flat panel display, a solid state display, etc.), and/or speakers. In the illustrated example, the infotainment head unit 502 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 502 displays the infotainment system on, for example, the display 110.

The cameras 504 of the vehicle 100 capture image(s) and/or video presented to occupant(s) of the vehicle 100 and/or are utilized to facilitate performance of autonomous and/or semi-autonomous driving maneuvers of the vehicle 100. In the illustrated example, the cameras 504 include the camera 102 (e.g., an external, front-view camera), the camera 104 (e.g., an external, rearview camera), the camera 106 (e.g., an internal, front-view camera), and the camera 200.

The sensors 506 are arranged in and around the vehicle 100 to monitor properties of the vehicle 100 and/or an environment in which the vehicle 100 is located. One or more of the sensors 506 may be mounted to measure properties around an exterior of the vehicle 100. Additionally or alternatively, one or more of the sensors 506 may be mounted inside a cabin of the vehicle 100 or in a body of the vehicle 100 (e.g., an engine compartment, wheel wells, etc.) to measure properties in an interior of the vehicle 100. For example, the sensors 506 include accelerometers, odometers, tachometers, pitch and yaw sensors, wheel speed sensors, microphones, tire pressure sensors, biometric sensors and/or sensors of any other suitable type. In the illustrated example, the sensors 506 include the sensor 112, the sensor 114, and the sensor 116. The sensor 112, the sensor 114, and/or the sensor 116 is a light sensor (e.g., a luminosity sensor, a lux sensor) that is capable of measuring a luminosity, a brightness, and/or other characteristics of ambient light. For example, the sensor 112 is adjacent to the camera 102 to detect characteristics of ambient light around the camera 102, the sensor 114 is adjacent to the camera 104 to detect characteristics of ambient light around the camera 104, and the sensor 116 is adjacent to the camera 106 to detect characteristics of ambient light around the camera 106.

The ECUs 508 monitor and control the subsystems of the vehicle 100. For example, the ECUs 508 are discrete sets of electronics that include their own circuit(s) (e.g., integrated circuits, microprocessors, memory, storage, etc.) and firmware, sensors, actuators, and/or mounting hardware. The ECUs 508 communicate and exchange information via a vehicle data bus (e.g., the vehicle data bus 510). Additionally, the ECUs 508 may communicate properties (e.g., status of the ECUs 508, sensor readings, control state, error and diagnostic codes, etc.) to and/or receive requests from each other. For example, the vehicle 100 may have seventy or more of the ECUs 508 that are positioned in various locations around the vehicle 100 and are communicatively coupled by the vehicle data bus 510. In the illustrated example, the ECUs 508 include an autonomy unit 516, a speed control unit 518, and a brake control module 520. For example, the autonomy unit 516 controls performance of autonomous and/or semi-autonomous driving maneuvers of the vehicle 100 based upon, at least in part, image(s) and/or video that are received from the camera module 118 and/or captured by one or more of the cameras 504. The speed control unit 518 receive signal(s) (e.g., from the autonomy unit 516) to autonomously control a speed at which the vehicle 100 travels, and the brake control module 520 receive signal(s) (e.g., from the autonomy unit 516) to autonomously operate brakes of the vehicle 100.

The vehicle data bus 510 communicatively couples the camera module 118, the infotainment head unit 502, the cameras 504, the sensors 506, and the ECUs 508. In some examples, the vehicle data bus 510 includes one or more data buses. The vehicle data bus 510 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
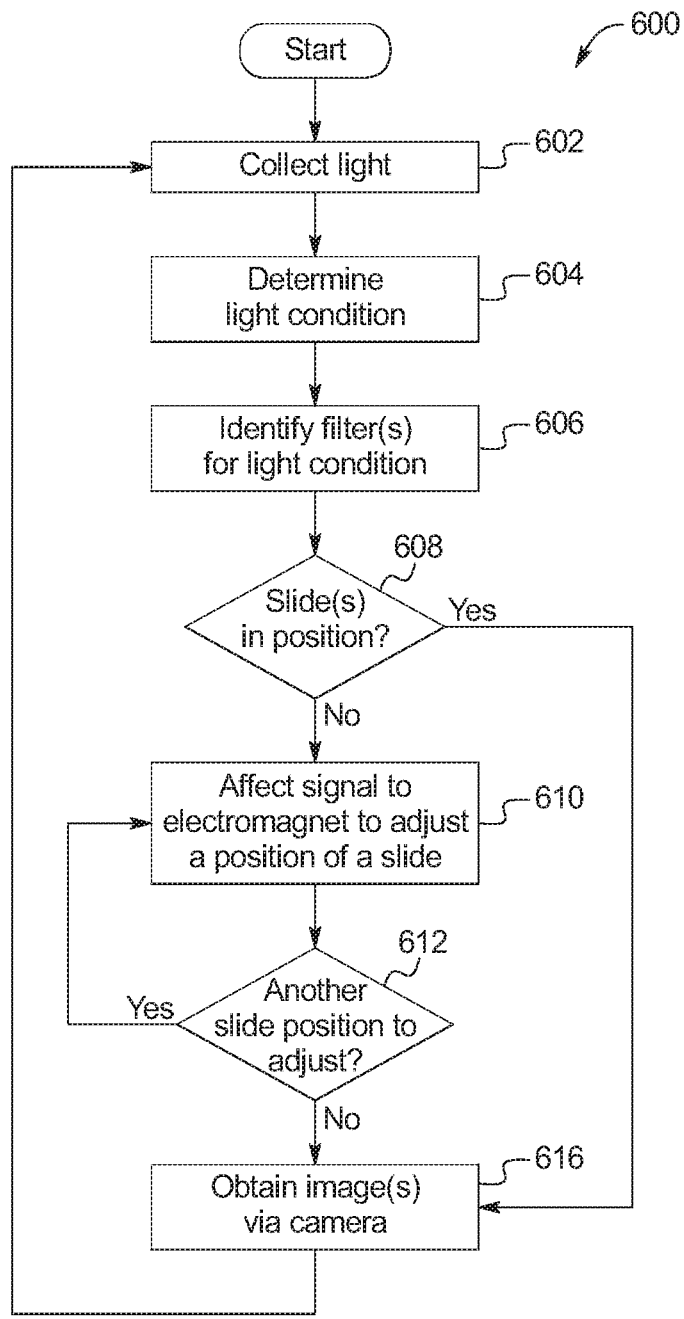
FIG. 6 is a flowchart for adjusting filter(s) of the camera of FIG. 2 of the vehicle of FIG. 1 in accordance with the teachings herein.

FIG. 6 is a flowchart of an example method 600 to adjust one or more filters of a vehicle camera and/or any other camera. The flowchart of FIG. 600 is representative of machine readable instructions that are stored in memory (such as the memory 514 of FIG. 5) and include one or more programs which, when executed by a processor (such as the processor 512 of FIG. 5), cause the vehicle 100 to implement the example filter controller 120 of FIGS. 1 and 5. While the example program is described with reference to the flowchart illustrated in FIG. 6, many other methods of implementing the example filter controller 120 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, light surrounding the camera 200 is collected. For example, the camera 200 (e.g., the camera 102 of FIG. 1, the camera 104 of FIG. 1, the camera 106 of FIG. 1, one of the cameras 504) and/or a light sensor (e.g., the sensor 112, the sensor 114, the sensor 116, one of sensors 506) adjacent to the camera 200 collects the light. At block 604, the filter controller 120 determines a light condition based upon the collected light. For example, the filter controller 120 may determined that the light condition is a first light condition, a second light condition (e.g., a glare condition), a third light condition (e.g., a fogginess), or a fourth light condition (e.g., a standard light condition).

At block 606, the filter controller 120 identifies filter(s) (e.g., the filter 210, the filter 212, the filter 304, the filter 306) of the camera 200 that are to be utilized (e.g., to increase a clarity of the captured images) based upon the light condition detected at block 604. For example, upon determining that the light condition is the first light condition, the filter controller 120 identifies the filter 210 (e.g., the first filter, the near-infrared pass filter) and the filter 304 (e.g., the third filter, the linear polarizer filter). Upon determining that the light condition is the second light condition (e.g., the glare condition), the filter controller 120 identifies the filter 212 (e.g., the second filter, the near-infrared cut filter) and the filter 304 (e.g., the third filter, the linear polarizer filter). Upon determining that the light condition is the third light condition (e.g., the fogginess), the filter controller 120 identifies the filter 210 (e.g., the first filter, the near-infrared pass filter) and the filter 306 (e.g., the fourth filter, the clear filter). Upon determining that the light condition is the fourth light condition (e.g., the standard light condition), the filter controller 120 identifies the filter 212 (e.g., the second filter, the near-infrared cut filter) and the filter 306 (e.g., the fourth filter, the clear filter).

At block 608, the filter controller 120 determines whether filter slide(s) (e.g., the slide 208, the slide 302) of the camera 200 are at position(s) that position the identified filter(s) between the lens 202 and the image sensors 206 of the camera 200. For example, if the identified filter(s) include the filter 210, the filter controller 120 determines whether the slide 208 is at the first position. If the identified filter(s) include the filter 212, the filter controller 120 determines whether the slide 208 is at the second position. If the identified filter(s) include the filter 304, the filter controller 120 determines whether the slide 302 is at the third position. If the identified filter(s) include the filter 306, the filter controller 120 determines whether the slide 302 is at the fourth position. Response to the filter controller 120 determining that the filter slide(s) are in position, the method 600 proceeds to block 614. Otherwise, response to the filter controller 120 determining that one or more of the filter slide(s) is not in position, the method 600 proceeds to block 610.

At block 610, the filter controller 120 affects a signal sent to a corresponding electromagnet to cause the electromagnet to adjust a position of the corresponding slide. In some examples, the filter controller 120 transitions from not sending to sending a first signal to the electromagnet 214 (e.g., a first electromagnet) to actuate the slide 208 from the second position to the first position. In other examples, the filter controller 120 transitions from sending to not sending the first signal to the electromagnet 214 to actuate the slide 208 from the first position to the second position.

At block 612, the filter controller 120 determines whether to adjust a position of another slide. In response to determining that there is another slide position to adjust, the method 600 returns to block 610. For example, the filter controller 120 transitions from not sending to sending a second signal to another electromagnet (e.g., a second electromagnet) to actuate the slide 302 from the fourth position to the third position or transitions from not sending to sending the second signal to the other electromagnet to actuate the slide 302 from the third position to the fourth position. Otherwise, in response to determining that there is no other slide position to adjust, the method 600 proceeds to block 614. At block 614, the camera 200 captures image(s) based upon light collected by the image sensors 206 that are previously filtered via one or more filters of the camera 200.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
   a camera including a lens, image sensors to collect light, a first electromagnet, a second electromagnet, a first slide including a first filter and a second filter, and a second slide adjacent the first side and including a third filter and a fourth filter; and a filter controller to:
determine a light condition based upon the light; and
responsive to determining the light condition is a first light condition, cause:
the first electromagnet to position the first slide at a first position at which the first filter is between the image sensors and the lens; and
the second electromagnet to position the second slide at a second position at which the third filter is between the image sensors and the lens.

2. A method for adjusting vehicle camera filters comprising:
collecting light of a surrounding area;
determining, via a filter controller, a light condition based upon the light; and
responsive to determining the light condition is a first light condition, sending:
a first signal to a first electromagnet to position a first slide of a vehicle camera at a first position, a first filter of the first slide being between image sensors and a camera lens at the first position; and
a second signal to a second electromagnet to position a second slide of the vehicle camera at a second position, a second filter of the second slide being between the image sensors and the camera lens at the second position.

3. The method of claim 2, further including, responsive to determining the light condition is a second light condition, not sending the first signal to the first electromagnet to position the first slide at a third position, a third filter of the first slide adjacent the first filter being between the image sensors and the camera lens at the third position.

4. The method of claim 3, further including, responsive to determining the light condition is the second light condition, sending the second signal to the first electromagnet to position the second slide at the second position.

5. The method of claim 4, wherein the third filter is a near-infrared cut filter, the second filter is a linear polarizer filter, and the second light condition is glare resulting from specular reflection of the light.

6. The method of claim 1, further including, responsive to determining the light condition is a third light condition, sending the signal to the first electromagnet to position the first slide at the first position and not sending the signal to the second electromagnet to position the second slide at a fourth position, a fourth filter of the second slide being between the image sensors and the camera lens adjacent the first filter at the fourth position, the third light condition being a fogginess.

7. The method of claim 6, further including, responsive to determining the light condition is a fourth light condition, not sending the signal to the first electromagnet to position the first slide at the third position and not sending the signal to the second electromagnet to position the second slide at the fourth position, the fourth light condition being a standard light condition.

8. A vehicle camera comprising:
sensors;
a lens to direct light to the sensors;
a first slide including a first filter and a second filter;
a second slide including a third filter and a fourth filter;
a first electromagnet to actuate the first slide between a first position and a second position, the first filter being between the sensors and the lens at the first position, the second filter being between the sensors and the lens at the second position; and
a second electromagnet to actuate the second slide between a third position and a fourth position, the third filter being between the sensors and the lens at the third position, the fourth filter being between the sensors and the lens at the fourth position.

9. The vehicle camera of claim 8, wherein the first slide includes magnetic material to enable the first electromagnet to actuate the first slide between the first position and the second position.

10. The vehicle camera of claim 8, wherein the first electromagnet causes the first slide to slide between the first position and the second position.

11. The vehicle camera of claim 8, wherein the first electromagnet causes the first slide to rotate between the first position and the second position.

12. The vehicle camera of claim 8, wherein the first slide includes a third filter.

13. The vehicle camera of claim 8, further including a housing in which the sensors, the first slide, the second slide, the first electromagnet, and the second electromagnet are housed.

14. The vehicle camera of claim 8, further including a biasing element coupled to the first slide to cause the first slide to be biased to the second position.

15. The vehicle camera of claim 8, wherein the second slide is at least partially positioned between the lens and the first slide and the first slide is at least partially positioned between the sensors and the second slide.

16. The vehicle camera of claim 8, wherein the first filter is a near-infrared pass filter, the second filter is a near-infrared cut filter, the third filter is a linear polarizer filter, and the fourth filter is a clear filter.

17. The vehicle camera of claim 8, wherein the second slide is perpendicular to the first slide.

* * * * *